(12) United States Patent
Heng et al.

(10) Patent No.: US 8,208,551 B2
(45) Date of Patent: Jun. 26, 2012

(54) METHOD AND SYSTEM FOR HIERARCHICALLY LAYERED ADAPTIVE MEDIAN MOTION VECTOR SMOOTHING

(75) Inventors: Brian Heng, Irvine, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1258 days.

(21) Appl. No.: 11/931,528

(22) Filed: Oct. 31, 2007

(65) Prior Publication Data

US 2009/0109342 A1    Apr. 30, 2009

(51) Int. Cl.
*H04N 5/341* (2011.01)
(52) U.S. Cl. .................................................. 375/240.16
(58) Field of Classification Search ......................... None
See application file for complete search history.

(56) References Cited

U.S. PATENT DOCUMENTS

| | | | |
|---|---|---|---|
| 2004/0013201 A1* | 1/2004 | Song et al. | 375/240.16 |
| 2008/0204592 A1* | 8/2008 | Jia et al. | 348/402.1 |
| 2009/0116557 A1* | 5/2009 | Nair | 375/240.16 |
| 2011/0080955 A1* | 4/2011 | Shi et al. | 375/240.16 |

* cited by examiner

*Primary Examiner* — Gregory Sefcheck
*Assistant Examiner* — Amar Persaud
(74) *Attorney, Agent, or Firm* — Thomas, Kayden, Horstemeyer & Risley LLP.

(57) ABSTRACT

Methods and systems for hierarchically layered adaptive median motion vector smoothing are disclosed. Aspects of one method may include generating motion vectors (MVs) for video pictures at each level of a hierarchical motion estimation process, where each level may use different resolution video pictures. The MVs may be smooth filtered at each level to reduce or remove spurious MVs. The smooth filtering may comprise scalar median filtering and/or vector median filtering. The smooth filtering may receive as inputs a plurality of MVs, for example, the MV being filtered and eight MVs from the surrounding video blocks. The vector costs of the nine MVs may be compared to a threshold vector cost, and those MVs with costs above the threshold value may be discarded. The threshold value may be dynamically changed based on, for example, content of the video pictures and/or to adjust a window size of the smoothing filter.

9 Claims, 11 Drawing Sheets

|  |  |  |
|---|---|---|
|  |  |  |
|  | Output_MV 650 |  |
|  |  |  |

FIG. 6B

|  |  |  |
|---|---|---|
| MV_A 602 | MV_B 604 | MV_C 606 |
| MV_D 608 | MV_E 610 | MV_F 612 |
| MV_G 614 | MV_H 616 | MV_I 618 |

METHOD AND SYSTEM FOR HIERARCHICALLY LAYERED ADAPTIVE MEDIAN MOTION VECTOR SMOOTHING

CROSS-REFERENCE TO RELATED APPLICATIONS/INCORPORATION BY REFERENCE

[Not Applicable]

FIELD OF THE INVENTION

Certain embodiments of the invention relate to processing of video data. More specifically, certain embodiments of the invention relate to a method and system for hierarchically layered adaptive median motion vector smoothing.

BACKGROUND OF THE INVENTION

In the past, methods for estimating such motion vectors have been so expensive that it was only cost-effective to perform motion-estimation and/or motion-compensation (ME/MC) in high-end video processors. However, recent advances in technology and reductions in cost have changed this situation, and ME/MC algorithms have become cost-effective in many consumer-level devices. ME/MC is currently being developed for, if not actively used in, current generation televisions, set-top boxes, DVD-players, and various other devices, to perform, for example, temporal filtering, de-interlacing, frame rate conversions, cross chroma reduction.

Accordingly, in many video processing applications, it may be useful to have knowledge of the motion that occurs from picture to picture. Video processing methods generally strive to accurately model motion between pictures for use with compression algorithms. One method is to double a display rate of a video sequence by repeating every picture twice. However, such picture repetition may result in motion judder or judder. Accordingly, various video processing standards, such as, for example, MPEG1 and MPEG2, may compress video using more sophisticated methods to estimate motion between pictures. Decoding such compressed video data may result in pictures, which may have other artifacts.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for hierarchically layered adaptive median motion vector smoothing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for hierarchically layered adaptive median motion vector smoothing. Aspects of the invention may comprise generating motion vectors for video pictures at each level of a hierarchical motion estimation process. The motion vectors may be generated using a different resolution for each level. The motion vectors generated by the hierarchical motion estimation process may be smooth filtered at each level so as to remove or reduce spurious motion vectors. The motion vectors at a lower level of the hierarchical motion estimation process may be scaled up to match the resolution of the next higher level before being communicated to the next higher level. The resulting scaled up motion vectors may be utilized to generate higher resolution motion vectors.

The smooth filtering may comprise scalar median filtering and/or vector median filtering. In an exemplary embodiment of the invention, the smooth filtering may receive, as inputs, a plurality of motion vectors, for example, the motion vector being filtered and eight motion vectors from the surrounding video blocks. The number of motion vectors from surrounding video blocks may vary, and accordingly, is not limited to eight. The vector cost values of the nine motion vectors may be compared to a threshold vector cost value, and those motion vectors that have vectors costs above the threshold value may be discarded. Accordingly, the window size of the smoothing filter may be adjusted by the threshold vector cost value used. The threshold vector cost value may also be dynamically changed based on, for example, content of the video pictures.

Figure 1:
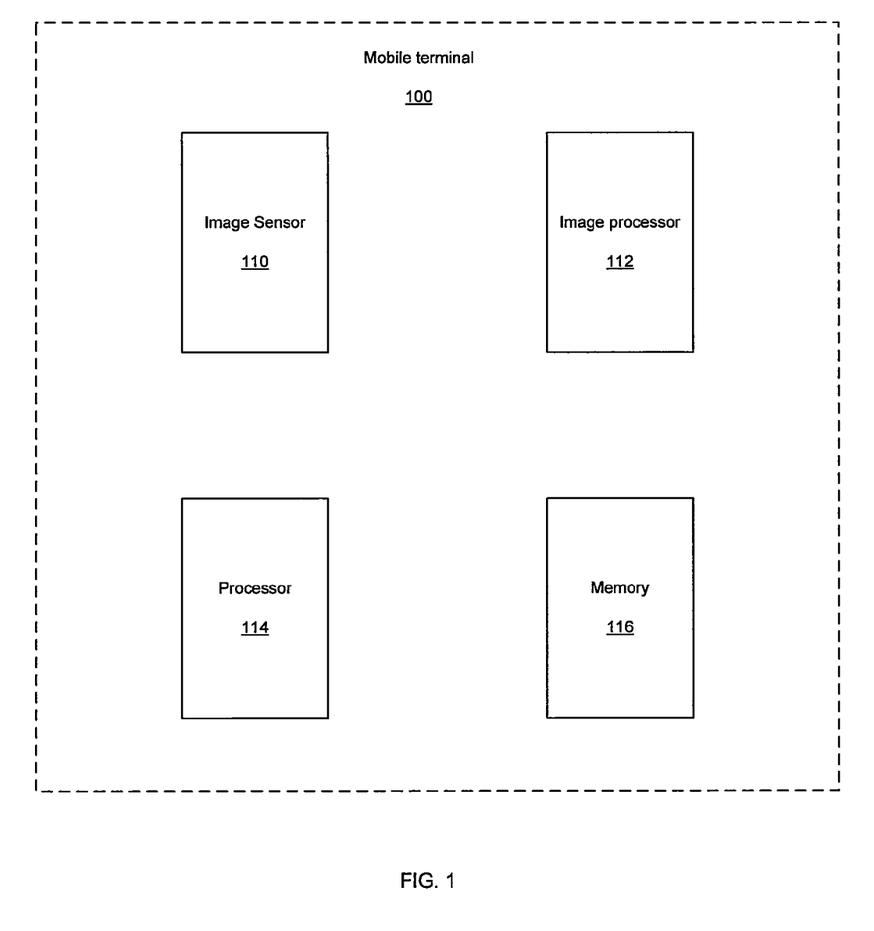
FIG. 1 is an exemplary diagram of a portion of a mobile terminal, in accordance with an embodiment of the invention.

FIG. 1 is an exemplary diagram of a portion of a mobile terminal, in accordance with an embodiment of the invention. Referring to FIG. 1, there is shown a mobile terminal 100. The mobile terminal 100 may comprise an image sensor 110, an image processor 112, a processor 114, and a memory block 116. The image sensor 110 may comprise suitable circuitry and/or logic that may enable capture of light intensity at a plurality of colors, such as, for example, red, green, and blue. The captured light intensity levels may be further processed as video and/or still photograph outputs. These color levels may be converted to, for example, a YUV color space and the resulting image information may be communicated to the image processor 112 for further processing.

The image processor 112 may comprise suitable circuitry and/or logic that may enable processing of video information. The processing may comprise, for example, compressing the video information from the image sensor 110. The video compression may comprise, for example, hierarchically layered adaptive median motion vector smoothing. The processor 114 may determine the mode of operation of various portions of the mobile terminal 100. For example, the processor 114 may set up data registers in the image processor block 112 to allow direct memory access (DMA) transfers of video data to the memory block 116. The processor may also communicate instructions to the image sensor 110 to initiate capturing of images. The memory block 116 may be used to store image data that may be processed and communicated by the image processor 112. The memory block 116 may also be used for storing code and/or data that may be used by the processor 114. The memory block 116 may also be used to store data for other functionalities of the mobile terminal 100. For example, the memory block 116 may store data corresponding to voice communication.

In operation, the processor 114 may initiate image capture by the image sensor 110. The image sensor 110 may communicate the video data corresponding to the captured images to the image processor 112. The image processor 112 may, for example, compress the video data in a suitable format for storing as a file. Hierarchically layered adaptive median motion vector smoothing by the image processor 112 is discussed with respect to FIGS. 2-8. The video data in the memory block 116 may be further processed by, for example, the processor 114.

Figure 2A:
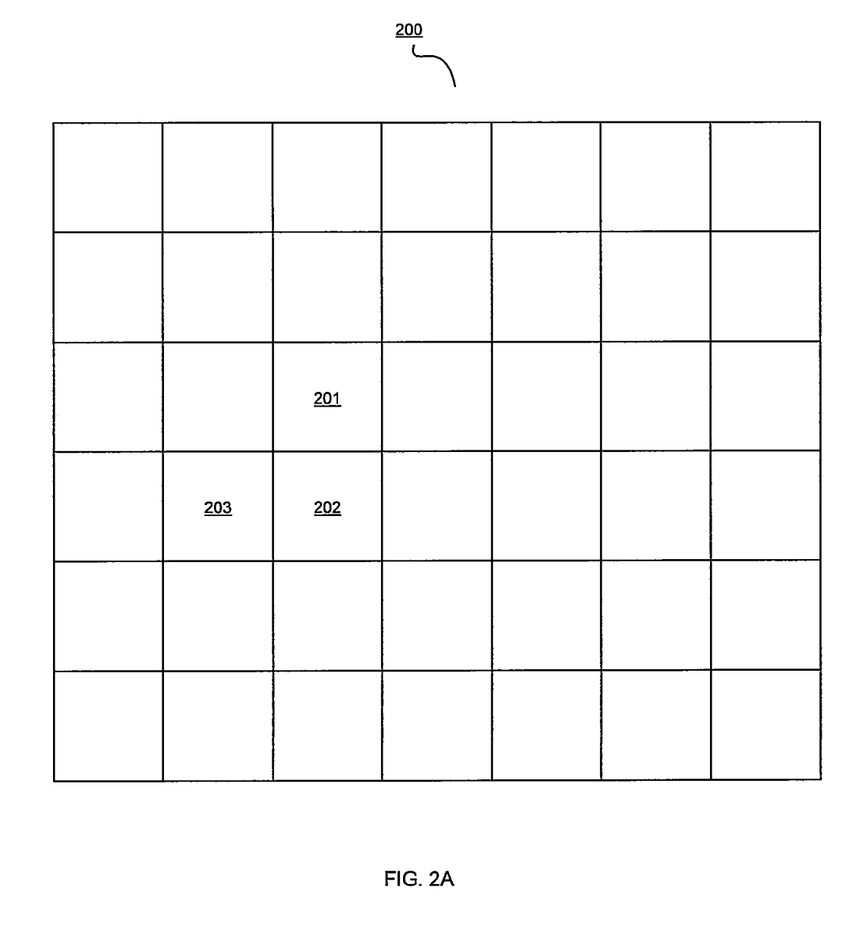
FIG. 2A is an exemplary image lattice illustrating initial motion vector locations, in accordance with an embodiment of the invention.
Figure 2B:
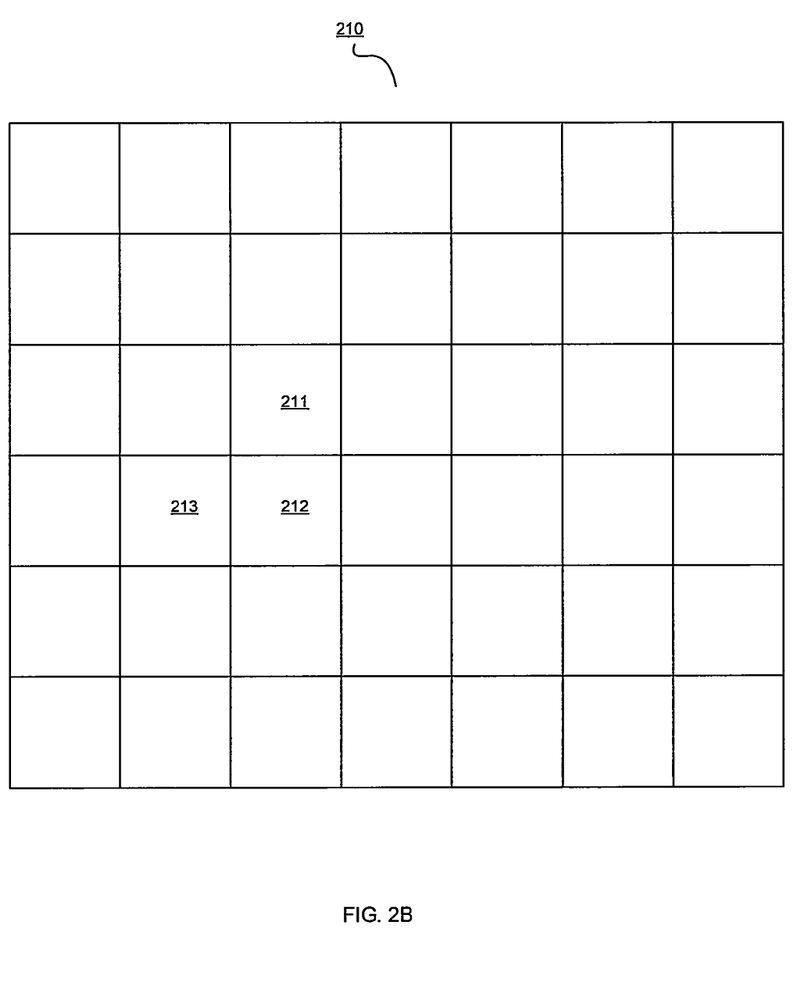
FIG. 2B is an exemplary image lattice illustrating determining motion vector locations, in accordance with an embodiment of the invention.

FIGS. 2A and 2B are exemplary image lattices illustrating motion vector estimations, in accordance with an embodiment of the invention. Referring to FIG. 2A, there is shown the image lattice 200, where the image lattice 200 may be a representation of a previous picture $F^{K-1}$. The image lattice 200 may comprise a plurality of blocks, where each block may comprise, for example, M pixels in a horizontal direction and N pixels in a vertical direction. For example, M and N may each be 16. Referring to FIG. 2B, there is shown the image lattice 210, where the image lattice 210 may be a representation of a present picture $F^K$. The image lattice 210 may be similar to the image lattice 200 with respect to the number of blocks in the image and where each block comprises M×N pixels. The image processor 112 may, for example, process image lattices to determine motion estimation between various pictures.

Motion estimation may be an effective but highly complex technique for video compression and other processing systems. To estimate the motion of a block of video, for example, the block 211 in the picture $F^K$, a search may be initiated to locate a most similar block, or a best matched block, in a previous picture. Based on the search, a motion vector may be generated that may indicate motion from a block in the previous picture to a block in the present picture. For example, the best match for the block 211 in the present picture $F^K$ may be the block 202 in the previous picture $F^{K-1}$. Accordingly, the motion vector for the block 211 may indicate movement from the block 202 in the picture $F^{K-1}$ to the block 211 in the present picture $F^K$. To search for the best matched block, a Full Search (FS) motion estimation may be used, where the algorithm may search through all possible candidates in a search range. This may result in smallest error in matching, or a smallest cost value, but the FS motion estimation may use most resources and most search time.

Accordingly, other search methods, such as, for example, a hierarchical search method, which may have a higher cost value, but a more efficient use of resources and a shorter search time, may be used. Basically, efficiency may be gained by skipping some candidate blocks so that the computational complexity may be lower but the search result may still be close to the best-matched result. The higher cost value may refer to loss of precision. Another method of searching may comprise, for example, a sub-sampling scheme, where an image may be sub-sampled to a smaller, lower resolution image for motion estimation search. Accordingly, these various methods may be combined to reduce a search time while limiting loss of precision. Various embodiments of the invention utilizing hierarchical search with sub-sampled video data is disclosed with respect to FIGS. 3-5, and 8.

Figure 3:
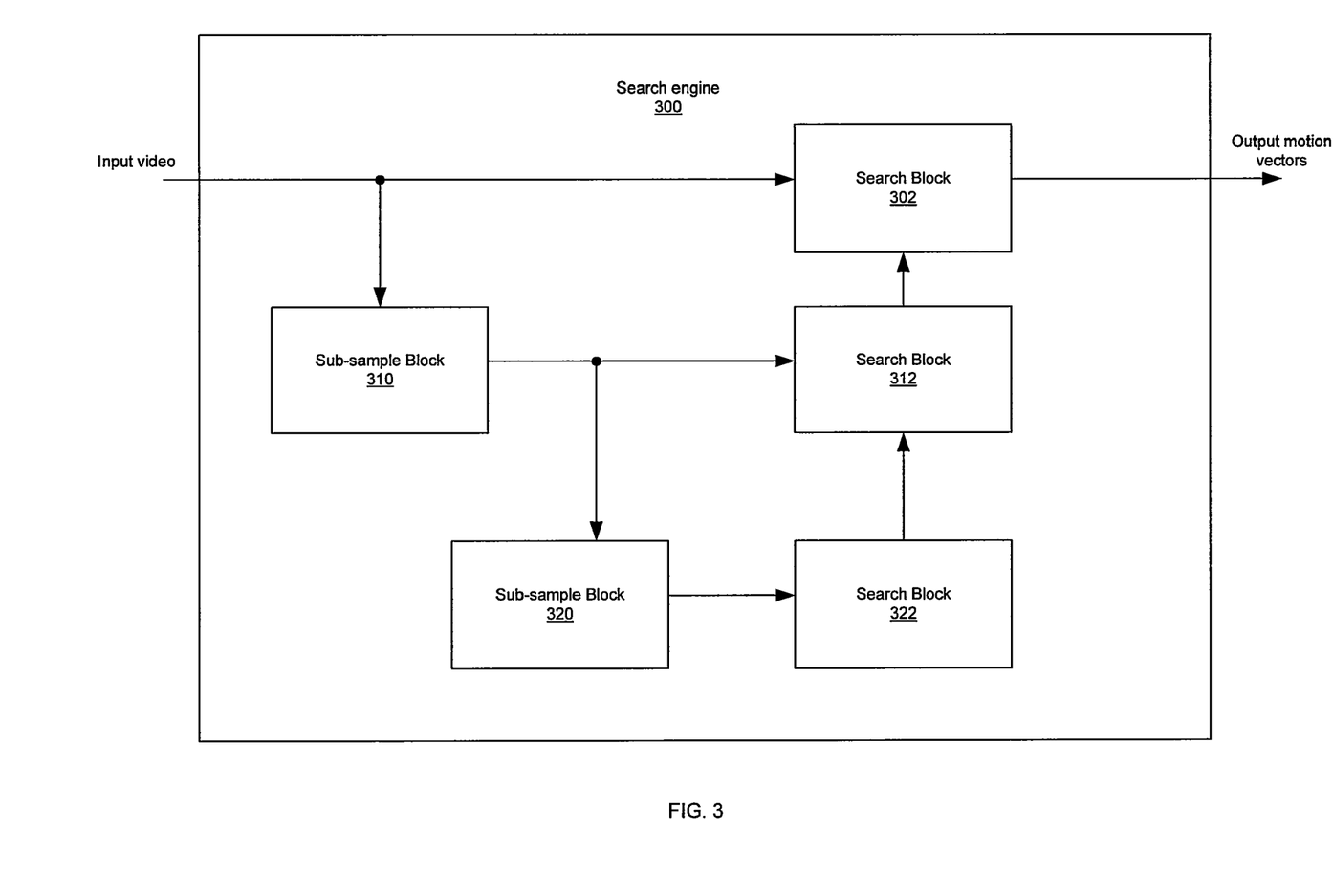
FIG. 3 is a data flow diagram illustrating exemplary multi-layer hierarchical motion estimation, in accordance with an embodiment of the invention.

FIG. 3 is a data flow diagram illustrating exemplary multilayer hierarchical motion estimation, in accordance with an embodiment of the invention. Referring to FIG. 3, there is shown a search engine 300, which may be a part of the image processor 112, for example, that may use a multi-layer hierarchical motion estimation algorithm. In an embodiment of the invention, the search engine 300 may operate on received video data in small blocks, such as, for example, blocks of 8 pixels by 8 pixels. Accordingly, each picture may comprise a plurality of blocks, and the motion from one picture to a next picture may be modeled in terms of translational shifts of these blocks. Each block may be assigned a two-dimensional (horizontal/vertical) motion vector (MV) that may describe the translational shift of that block.

A portion of the search engine 300 may comprise, for example, sub-sampling blocks 310 and 320, and search blocks 302, 312, and 322. The sub-sampling blocks 310 and 320 may comprise suitable logic, circuitry, and/or code that may enable receiving video data and generating output video data that may comprise one-half the resolution of the input video data. The search blocks 302, 312, and 322 may comprise suitable logic, circuitry, and/dr code that may enable receiving video data for a present picture and a previous picture, and determining a block in the previous picture that may most closely match a block in the present picture.

In operation, input video data may be received as pictures, for example, by the search engine 300, and communicated to the sub-sampling block 310 and the search block 302. The input video data may be received, for example, from the image sensor 110. The sub-sampling block 310 may sub-sample the input picture, which may be a full-resolution picture, to generate a lower resolution picture. The sub-sampling may utilize, for example, a factor of 2×2. Accordingly, the full-resolution picture may be down-sampled by a factor of two in both horizontal and vertical directions, and the result may be a half-resolution picture. The half-resolution picture may be communicated to the search block 312 and to the sub-sampling block 320.

The sub-sampling block 320 may sub-sample the half-resolution picture to generate a lower resolution picture. The sub-sampling may also utilize, for example, a factor of 2×2. Accordingly, the half-resolution picture may be down-sampled to a quarter-resolution picture. The quarter-resolution picture may be communicated to the search block 322.

The search block 322 may perform a search to determine a motion estimation for each quarter-resolution block in the present picture $F^K$ with respect to a quarter resolution block in the previous picture $F^{K-1}$. The search block 322 may search in the search range of the previous block $F^{K-1}$ for a quarter-resolution block that may most closely match the block in the present picture $F^K$. A motion vector may then be generated for each block in the present picture $F^K$. The motion vectors for the quarter-resolution present picture $F^K$ may be scaled up by two to account for the sub-sampling by the sub-sampling block 320 and communicated to the next level search block 312.

Accordingly, the search block 312 may use the motion vectors from the search block 322 to refine its search for a half-resolution block in the previous picture $F^{K-1}$ that may most closely match a half-resolution block in the present picture $F^K$. The search block 312 may be enabled to search within a search range that may be design dependent. The motion vectors for the half-resolution present picture $F^K$ may be scaled up by two to account for the sub-sampling by the sub-sampling block 310 and communicated to the next level search block 302.

Similarly, the search block 302 may use the motion vectors from the search block 312 to refine its search for a full-resolution block in the previous picture $F^{K-1}$ that may most closely match a full-resolution block in the present picture $F^K$. The search block 302 may be enabled to search within a search range that may be design dependent. The motion vector for each full-resolution block in the present picture $F^K$ may be output for use by, for example, the image processor 112 for generating compressed video from the input video data.

Accordingly, block motion estimation using sub-sampled pictures take a wider, more "global" look at the input pictures. This global view of a local area may enable reduction in spurious motion vectors since the lower resolution blocks may act as a low-pass filter for the video information in the pictures. The motion estimations at each level may be refined about a previous result to provide improved results with small details, and the motion estimations may converge to the final full-resolution estimation. This may effectively keep motion estimations in a local region close to the initial results. The search range, or the local region, for each search block may be, for example, programmable by the processor 114 and/or the image processor 112.

Various embodiments of the invention may comprise a plurality of levels of search, and the specific number of search levels may be design and/or implementation dependent. Similarly, various embodiments of the invention may comprise sub-sampling video pictures at sub-sampling rates other than 2×2, and the sub-sampling by each of the sub-sampling blocks need not be the same. The specific sub-sampling rate for each sub-sampling block may be controlled by a processor, such as the image processor 112 and/or the processor 114.

Figure 4A:
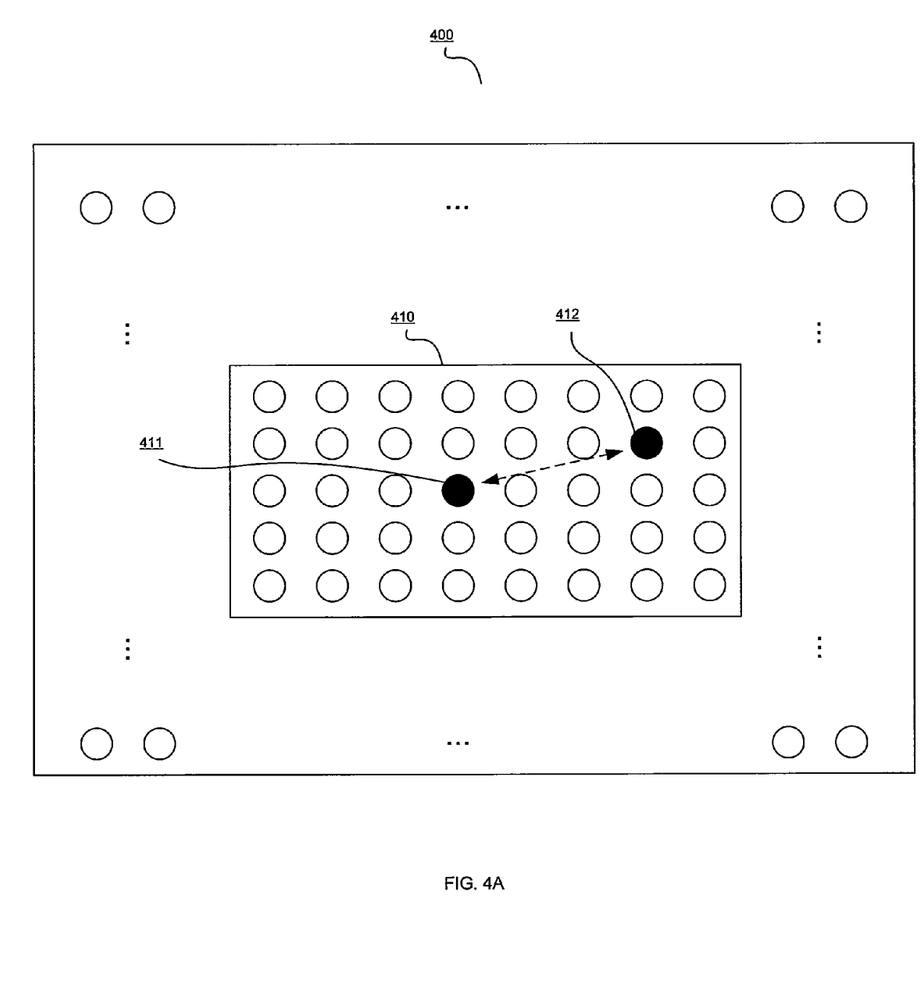
FIG. 4A is a diagram illustrating an exemplary initial motion vector search in a quarter resolution image, in accordance with an embodiment of the invention.
Figure 4B:
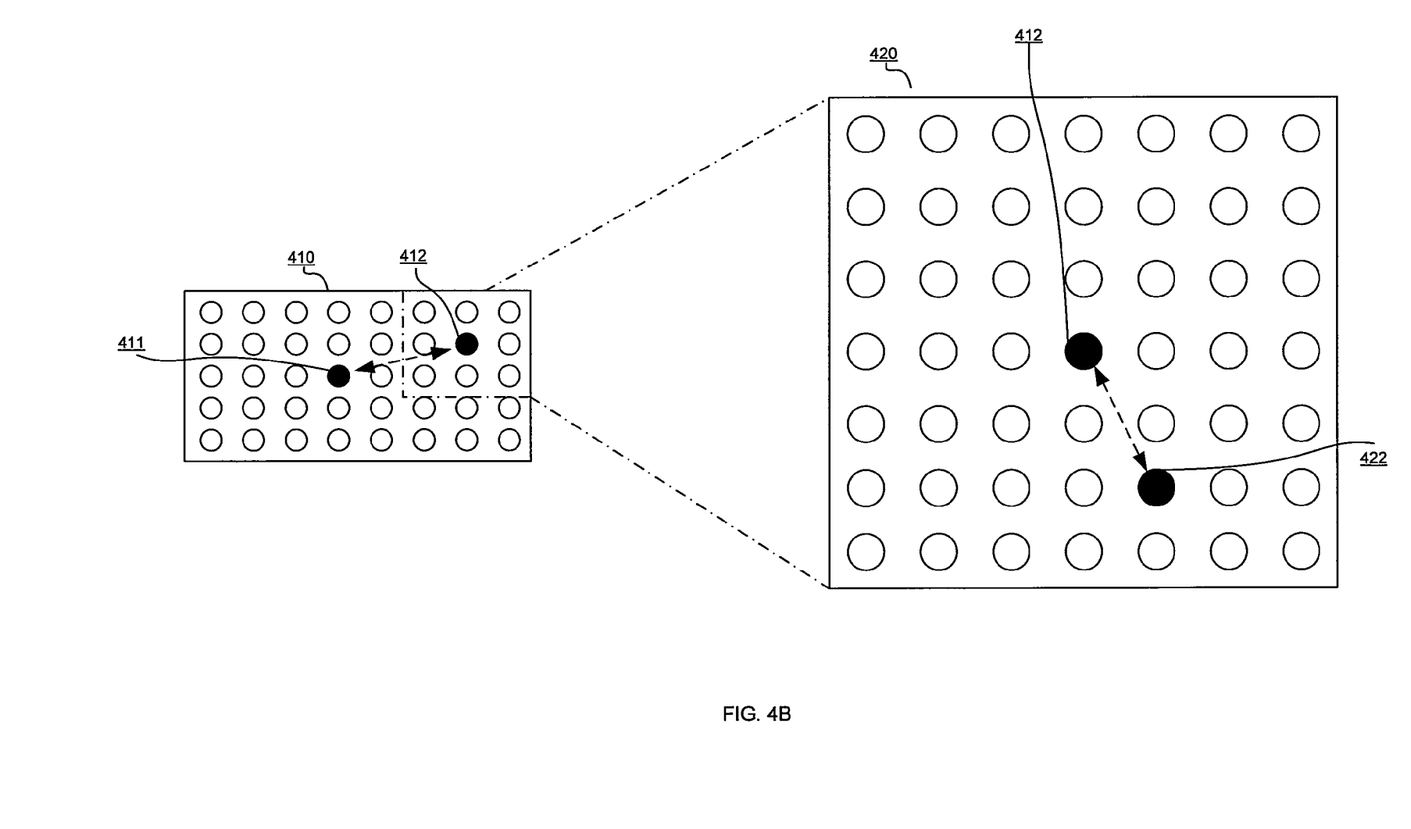
FIG. 4B is a diagram illustrating an exemplary second motion vector search in a half resolution image, in accordance with an embodiment of the invention.
Figure 4C:
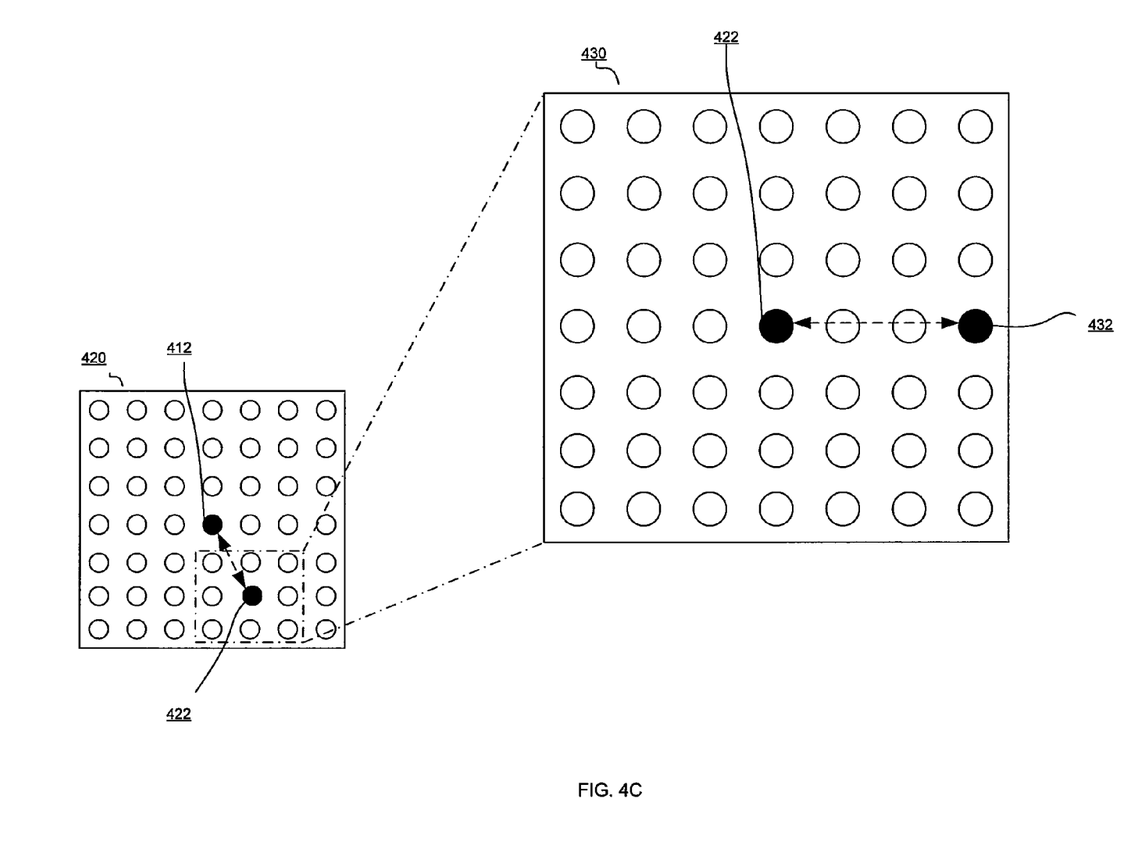
FIG. 4C is a diagram illustrating an exemplary third motion vector search in a full resolution image, in accordance with an embodiment of the invention.

FIGS. 4A, 4B, and 4C illustrate exemplary motion vector searches using multi-layer hierarchical motion estimation, in accordance with an embodiment of the invention. Although an exemplary search description with respect to FIGS. 4A-C is for one block in a video picture, the motion vector search may be made for other portions, including all blocks, in a video picture before the determined motion vectors are communicated to a next level for further searches. Referring to FIG. 4A, there is shown a quarter-resolution picture 400 comprising a search range 410 that may be used by the search block 322, where the search range 410 may comprise a plurality of quarter-resolution video blocks about the video block to be matched.

The search range 410 may comprise, for example, an entire video picture, or a portion of the video picture about the video block for which the search is being made. The video block position 411 may correspond to, for example, a quarter-resolution block in the present picture $F^K$ for which a motion estimate may be generated by the search block 322. The video block position 412 may correspond to, for example, a quarter-resolution block in the previous picture $F^{K-1}$ that may best match the quarter-resolution block in the video block position 411. Accordingly, a motion vector may be generated for the video block in the video block position 411 that may correspond to the motion from the quarter-resolution video block position 412. In addition to the motion vector, a vector cost may be generated, where the vector cost, which may be a measure of distortion, may be generated. The vector cost may be used as an indication of confidence in the motion vector. This motion vector may be scaled up by two to account for the sub-sampling by the sub-sampling block 320 and communicated to the next level search block 312. The scaled motion vector may then be used by the search block 312 to perform a motion vector refinement around the result from quarter-resolution search by the search block 322.

Referring to FIG. 4B, there is shown a search range 420 that may be used by the search block 312, where the search range 420 may comprise a plurality of half-resolution video blocks. The search range 420 may comprise, for example, a portion of the video picture about the video block position 412, where the video block position 412 was determined by the search block 322. Accordingly, the search block 312 may search for a half-resolution video block in the search range 420 of the previous picture $F^{K-1}$ that may best match the half-resolution video block in the half-resolution video block position 412 in the present picture $F^K$. The best match may be, for example, a half-resolution video block in the video block position 422.

Accordingly, a motion vector may be generated for the video block in the video block position 411 that may correspond to the motion from the half-resolution video block position 422. The vector cost generated with respect to the video block position 412 may be re-calculated based on the new video block position 422. This motion vector may then be scaled up by two to account for the sub-sampling by the sub-sampling block 310 and communicated to the next level search block 302. The scaled motion vector may then be used by the search block 302 to perform a motion vector refinement around the result from half-resolution search by the search block 312.

Referring to FIG. 4C, there is shown a full-resolution search range 420 that may be used by the search block 302, where the search range may comprise a plurality of full-resolution video blocks. The search range 430 may comprise, for example, a portion of the video picture about the video block position 422, where the video block position 422 was determined by the search block 312. Accordingly, the search block 302 may search for a full-resolution video block in the previous picture $F^{K-1}$ that may best match the full-resolution video block in the full-resolution video block position 422 in the present picture $F^K$. The best match may be, for example, a full-resolution video block in the video block position 432.

Accordingly, a motion vector may be generated for the video block in the video block position 411 that may correspond to motion from the full-resolution video block position 432. Again, the vector cost generated with respect to the video block position 422 may be re-calculated based on the new video block position 432. The vector cost with respect to the video block position 432 may be expected to be lower than the initial vector cost with respect to the video block position 412. This motion vector may be used, for example, by the image processor 112 to generate predictive (P) pictures and/or bi-predictive (B) pictures.

Accordingly, with respect to FIGS. 4A-4C, at quarter-resolution, the reasonable motion vector search range may be reduced by a factor of 4. This may allow the search to be much smaller in extent and still be able to track fast moving objects. By refining the vectors at the half-resolution level and the full-resolution level, the quality of the motion vectors relative to results may be improved using the initial quarter-resolution search. However, the search range used during these refinement stages may be made relatively small since the best matched video block may tend to be near the motion vector passed up from the lower resolution level.

Figure 5:
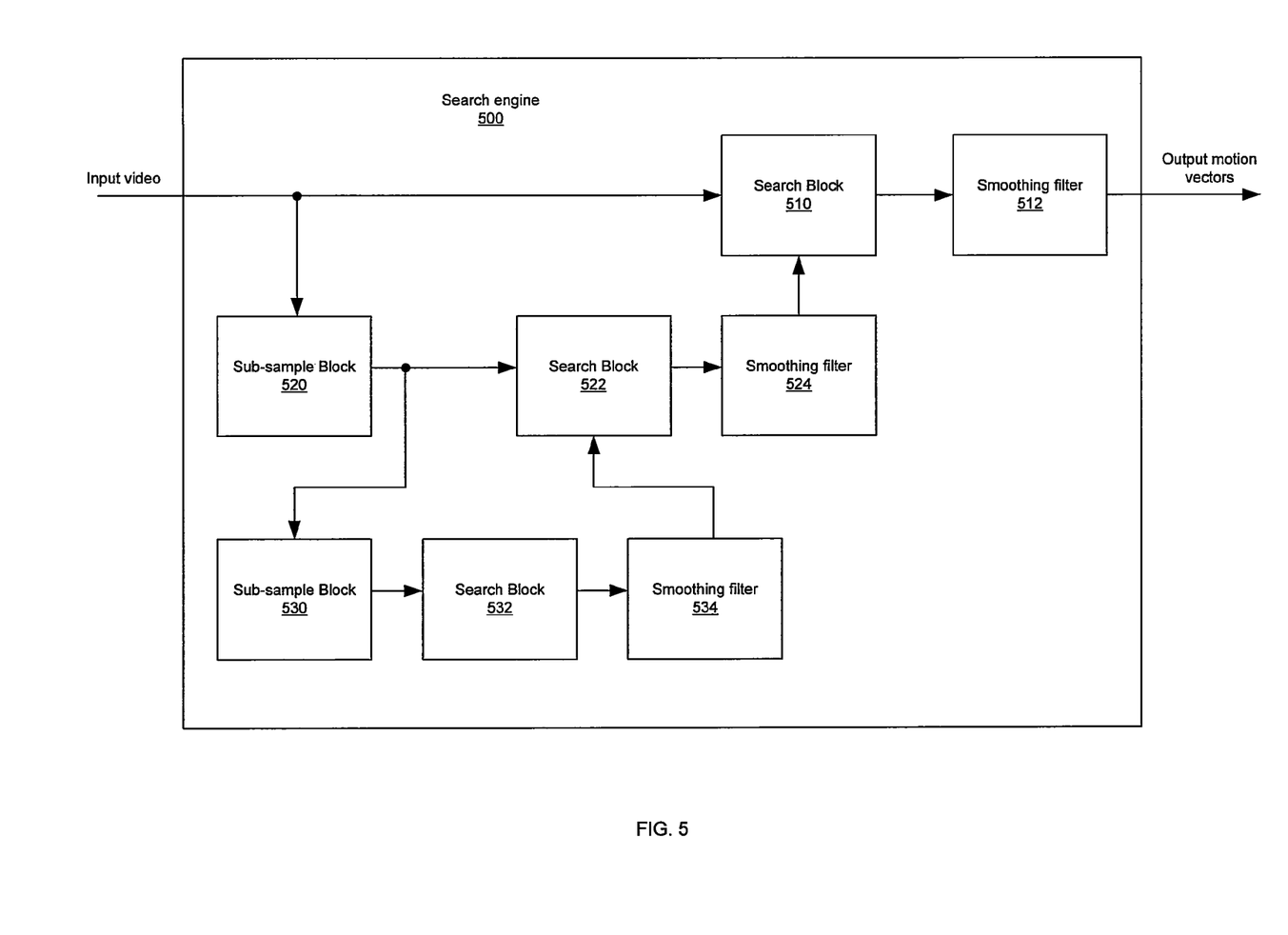
FIG. 5 is a data flow diagram illustrating an exemplary hierarchical motion vector search combined with layer motion vector smoothing, in accordance with an embodiment of the invention.

FIG. 5 is a data flow diagram illustrating an exemplary hierarchical motion vector search combined with layer motion vector smoothing, in accordance with an embodiment of the invention. Referring to FIG. 5, there is shown the search engine 500 that may comprise search blocks 510, 522, and 532, smoothing filter blocks 512, 524, and 534, and sub-sampling blocks 520 and 530. The search blocks 510, 522, and 532, and the sub-sampling blocks 520 and 530 may be similar to the corresponding components that are described with respect to FIG. 3. The smoothing filter blocks 512, 524, and 534 may comprise suitable logic, circuitry, and/or code that may enable attenuation or removal of spurious motion vectors to leave a more consistent motion vector field.

The search engine 500, which may be a part of the image processor 112, for example, may use a multi-layer hierarchical motion estimation algorithm with motion vector smoothing for the motion vectors generated by the search blocks 510, 522, and 532. In an embodiment of the invention, the search engine 500 may operate on received video data in small blocks, such as, for example, blocks of 8 pixels by 8 pixels. Accordingly, each picture may comprise a plurality of blocks, and the motion from one picture to a next picture may be modeled in terms of translational shifts of these blocks. Each block may be assigned a two-dimensional (horizontal/vertical) motion vector that may describe the translational shift of that block.

In operation, input video data may be received as pictures, for example, by the search engine 500, and communicated to the sub-sampling block 520 and the search block 510. The input video data may be received, for example, from the image sensor 110. The sub-sampling block 520 may sub-sample the input picture, which may be a full-resolution picture, to generate a lower resolution picture. The sub-sampling may be, for example, by a factor of 2×2. Accordingly, the full-resolution picture may be down-sampled by a factor of two in both horizontal and vertical directions, and the result may be a half-resolution picture. The half-resolution picture may be communicated to the search block 522 and to the sub-sampling block 530.

The sub-sampling block 530 may sub-sample the half-resolution picture to generate a lower resolution picture. The sub-sampling may also be, for example, by a factor of 2×2. Accordingly, the half-resolution picture may be down-sampled to a quarter-resolution picture. The quarter-resolution picture may be communicated to the search block 532.

The search block 532 may perform a search to determine a motion estimation for each quarter-resolution block in the present picture $F^K$ with respect to a quarter resolution block in the previous picture $F^{K-1}$. The search block 532 may search in the search range of the previous block $F^{K-1}$ for a quarter-resolution block that may most closely match the block in the present picture $F^K$. A motion vector may then be generated for each block in the present picture $F^K$.

The motion vectors for the quarter-resolution present picture $F^K$ may be scaled up by two to account for the sub-sampling by the sub-sampling block 530. The scaled motion vectors may be communicated to the smoothing filter block 534. The smoothing filter block 534 may filter the motion vectors to remove spurious motion vectors to generate a more consistent motion vector field. An embodiment of the smoothing filter blocks 512, 524, and 534 is described in more detail with respect to FIGS. 6A, 6B, and 7. The filtered motion vectors for the present quarter-resolution picture $F^K$ may be communicated to the search block 522.

Accordingly, the search block 522 may use the motion vectors from the smoothing filter block 534 to refine its search for a half-resolution block in the previous picture $F^{K-1}$ that may most closely match a half-resolution block in the present picture $F^K$. The search block 522 may make its search within a search range that may be design dependent. A motion vector may then be generated for each block in the half-resolution present picture $F^K$. The motion vectors for the half-resolution present picture $F^K$ may be scaled up by two to account for the sub-sampling by the sub-sampling block 520 and communicated to the smoothing filter block 524. The smoothing filter block 524 may filter the motion vectors to remove spurious motion vectors to generate a more consistent motion vector field. The filtered motion vectors for the half-resolution present picture $F^K$ may be communicated to the search block 510.

The search block 510 may use the motion vectors from the smoothing filter block 524 to refine its search for a full-resolution block in the previous picture $F^{K-1}$ that may most closely match a full-resolution block in the present picture $F^K$. The search block 510 may make its search within a search range that may be design dependent. A motion vector may then be generated for each block in the full-resolution present picture $F^K$. The motion vectors for the full-resolution present picture $F^K$ may be communicated to the smoothing filter block 512. The smoothing filter block 512 may filter the motion vectors to remove spurious motion vectors to generate a more consistent motion vector field. The filtered motion vectors for the full-resolution present picture $F^K$ may be output for use by, for example, the image processor 112 for generating compressed video from the input video data.

The block motion estimation using sub-sampled pictures takes a wider, more "global" look at the input pictures. This global view of a local area may result in a reduction of spurious motion vectors since the lower resolution blocks may act as a low-pass filter for the video information in the pictures. The motion estimations at each level may refined about a previous result to provide improved results with small details, and the motion estimations may converge about the original lowest resolution estimation. This may effectively keep motion estimations in a local region close to the initial results. The search range, or the local region, for each search block may be, for example, programmable by the processor 114 and/or the image processor 112.

Various embodiments of the invention may comprise a plurality of levels of search, and the specific number of search levels may be design and/or implementation dependent. Similarly, various embodiments of the invention may comprise sub-sampling video pictures by factors other than sub-sample rate of 2×2, and the sub-sampling by each of the sub-sampling blocks need not be the same. The specific sub-sampling rate for each sub-sampling block may be controlled by a processor, such as the image processor 112 and/or the processor 114.

While an embodiment of the invention is described using a smoothing filter for the outputs of the search blocks 510, 522, and 532, the invention need not be so limited. For example, various embodiments of the invention may apply smoothing filtering for only a portion of search blocks that may be used in a search engine. Additionally, while an embodiment of the invention described the output motion vectors as being scaled by the search blocks 532 and 522, the invention need not be so limited. For example, the scaling may be performed by the smoothing filters 534 and/or 524.

Figure 6A:
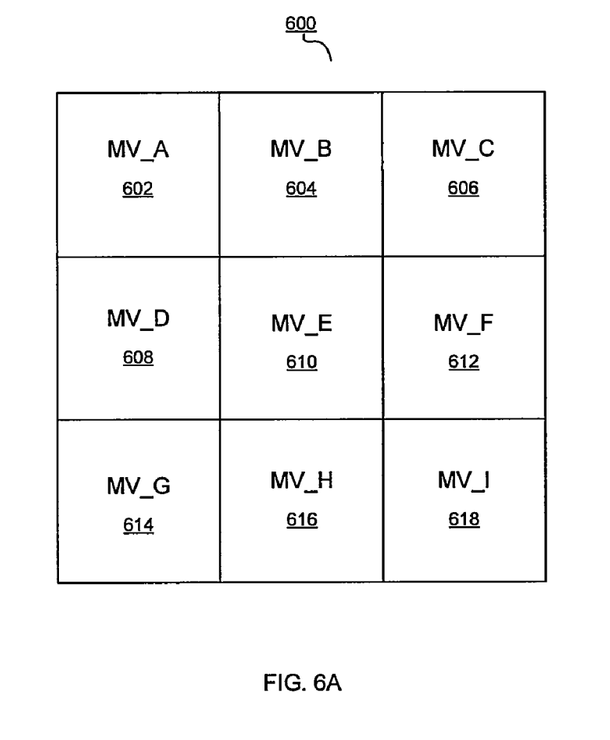
FIG. 6A is a diagram illustrating exemplary block vector inputs to a motion vector smoothing filter, in accordance with an embodiment of the invention.
Figure 6B:
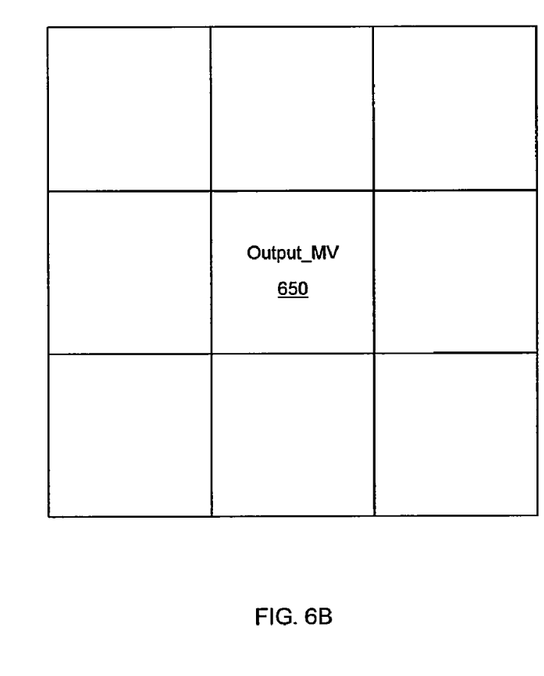
FIG. 6B is a diagram illustrating an exemplary output motion vector generated by a smoothing filter, in accordance with an embodiment of the invention.

FIG. 6A is a diagram illustrating exemplary block vector inputs to a motion vector smoothing filter, in accordance with an embodiment of the invention. FIG. 6B is a diagram illustrating an exemplary output motion vector generated by a smoothing filter, in accordance with an embodiment of the invention. FIGS. 6A and 6B are illustrations of exemplary block vector inputs to a motion vector smoothing filter resulting in an output motion vector generated by a smoothing filter, in accordance with an embodiment of the invention. Referring to FIG. 6A, there is shown a diagram 600 of a cluster of motion vectors 602 . . . 618. The motion vectors 602 . . . 618 may be used to generate an output motion vector that may correspond to the motion vector MV_E 610. Accordingly, each motion vector in a picture may be smooth filtered using the motion vectors surrounding it. Referring to FIG. 6B, there is shown an output motion vector 650 generated by a smoothing filter block, such as, for example, the smoothing filter block 512, 524, or 534.

In operation, the motion vector 610 may be filtered using the motion vectors 602, 604, 606, 608, 612, 614, 616, and 618 that may immediately surround it. Various embodiments of the invention may use different motion vectors to filter a particular motion vector. The filtering may comprise, for example, selecting a median value of the input motion vectors. The median filtering is described with respect to FIG. 7.

For motion vectors at the edges of the picture, various embodiments of the invention may use those motion vectors that are available. For example, if the motion vector 610 is the first motion vector for a picture, only the three motion vectors 612, 616, and 618 may be used. Other embodiments of the invention may, for example, replicate a motion vector for those motion vectors that may not be available. For example, if the motion vector 610 is the first motion vector for a picture, the motion vector 610 may be replicated and used in place of the missing motion vectors 602, 604, 606, 608, and 614. The specific handling of the edge motion vector may be design dependent.

Figure 7:
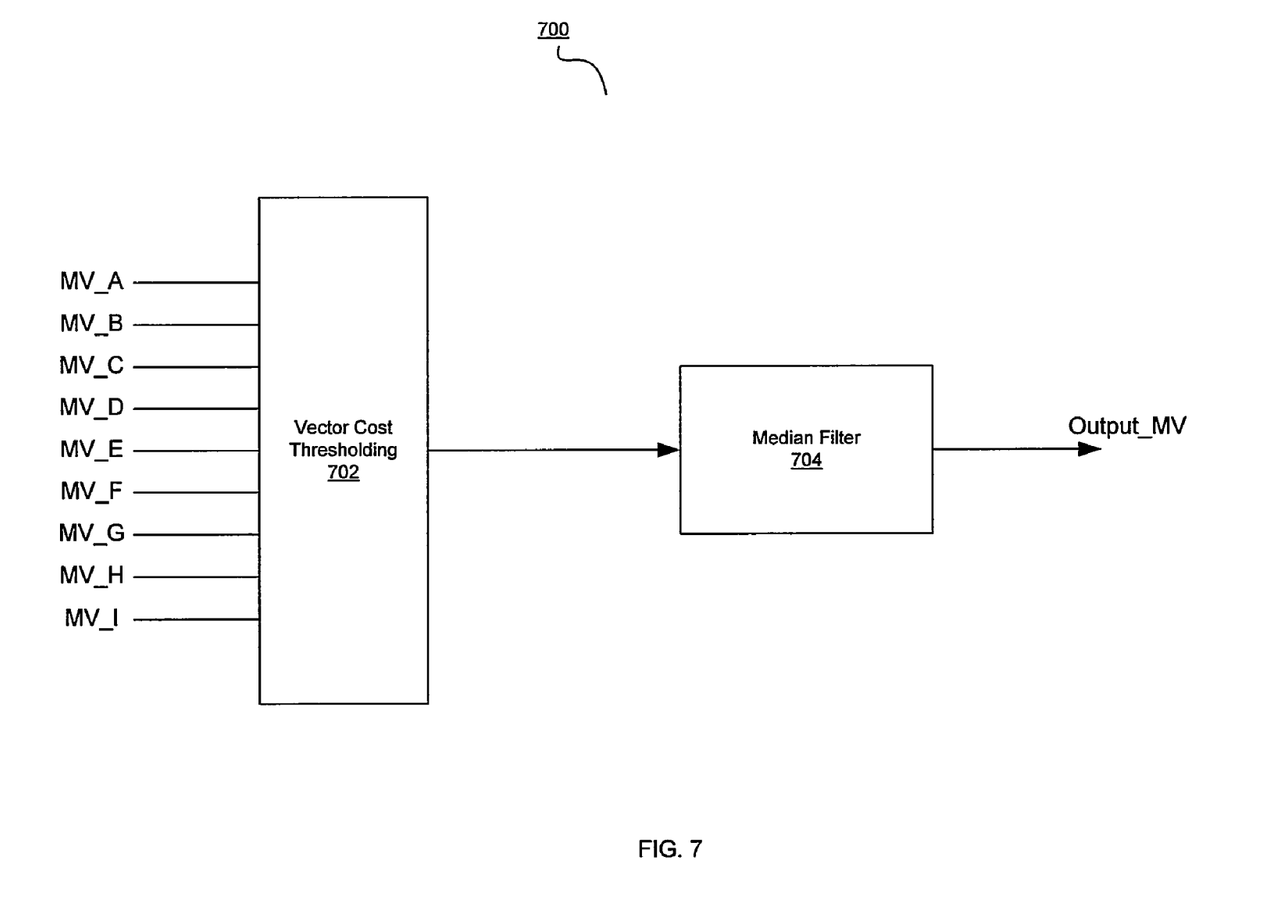
FIG. 7 is a block diagram illustrating an exemplary motion vector smoothing filter, in accordance with an embodiment of the invention.

FIG. 7 is a block diagram illustrating an exemplary motion vector smoothing filter, in accordance with an embodiment of the invention. Referring to FIG. 7, there is shown a smoothing filter block 700 comprising a vector cost thresholding block 702 and a median filter block 704. The smoothing filter block 700 may be similar to, for example, the smoothing filter blocks 512, 524, and 534. The vector cost thresholding block 702 may comprise suitable logic, circuitry, and/or code that may enable determining whether input motion vectors may have vector costs above a threshold vector cost. Those motion vectors with vector costs that are above the threshold vector cost may be discarded. Accordingly, only those motion vectors that have vector costs less than or equal to the threshold vector cost may be output. The median filter block 704 may comprise suitable logic, circuitry, and/or code that may enable determining an output motion vector that may be a median of the input motion vectors.

In operation, the motion vectors MV_A, . . . , MV_E, . . . MV_I may be communicated to smoothing filter block 700 to generate a filtered output motion vector Output_MV that may correspond to the motion vector MV_E. The motion vectors MV_A, . . . , MV_E, . . . MV_I may correspond to the motion vectors described with respect to FIG. 6A, and the motion vector Output_MV output by the filter block 700 may correspond to the motion vector Output_MV described with respect to FIG. 6B.

The motion vectors MV_A, . . . , MV_E, . . . MV_I may be received by the vector cost thresholding block 702. The vector cost values of the each of the motion vectors MV_A, . . . , MV_E, . . . MV_I may be compared to a threshold vector cost value, where the threshold vector cost value may be programmable, for example, by the processor 114. Any motion vector whose vector cost is above this threshold vector cost may be ignored. The remaining motion vectors may be communicated to the median filter block 704. Accordingly, the threshold vector cost value may be used to adaptively adjust the size and shape of the median filter window. Various embodiments of the invention may also adjust the threshold vector cost value based, for example, on the content of the video pictures. When the vector cost values of all the motion vectors input to the vector cost thresholding block 702 are above the threshold vector cost value, then just the motion vector that is being filtered, for example, the motion vector MV_E, may be communicated to the median filter block 704.

The median filter block 704 may perform a median operation upon the input motion vectors to generate an output motion vector for the smoothing filter block 700. In the exemplary median filter block 704, the number of input vectors may range from one to nine. The median filter block 704 may generate a motion vector that may be a median of the input motion vectors. This median filtering process may be either a scalar or vector median filtering process.

The scalar median filtering process may comprise a 1-dimensional operation that may be performed independently on dx and dy components of the motion vectors. The dx and dy components may be horizontal and vertical components, respectively, of a motion vector. In general, the median of either the dx or dy component may be determined by sorting all input motion vectors into, for example, an increasing order and selecting the value at the midpoint of the motion vectors. In instances when there may be an even number of motion vectors, the median filter block 704 may, for example, select one of the two motion vectors that may be closest to a median value, or interpolate an output motion vector from the two motion vectors that may be closest to the median value. The specific scalar median operation may be design dependent.

The vector median filtering process may comprise a 2-dimensional operation that may be performed jointly on the dx and dy components of the input motion vectors. The vector median (VM) operation may be defined as determining an input vector that may minimize the "distance" to all other input motion vectors, as represented below:

$$VM(\vec{X}_1, \vec{X}_2, \ldots, \vec{X}_N) = \vec{X}_{VM},$$

where $$\sum_{i=1}^{N} \|\vec{X}_{VM} - \vec{X}_i\|_L \leq \sum_{i=1}^{N} \|\vec{X}_j - \vec{X}_i\|_L, \text{ for } j = 1, 2, 3, \ldots, N$$

The parameter 'L' may be the order of the "distance" measurement. For example, L=1 may imply an absolute value, and L=2 may imply a squared Euclidian distance.

Figure 8:
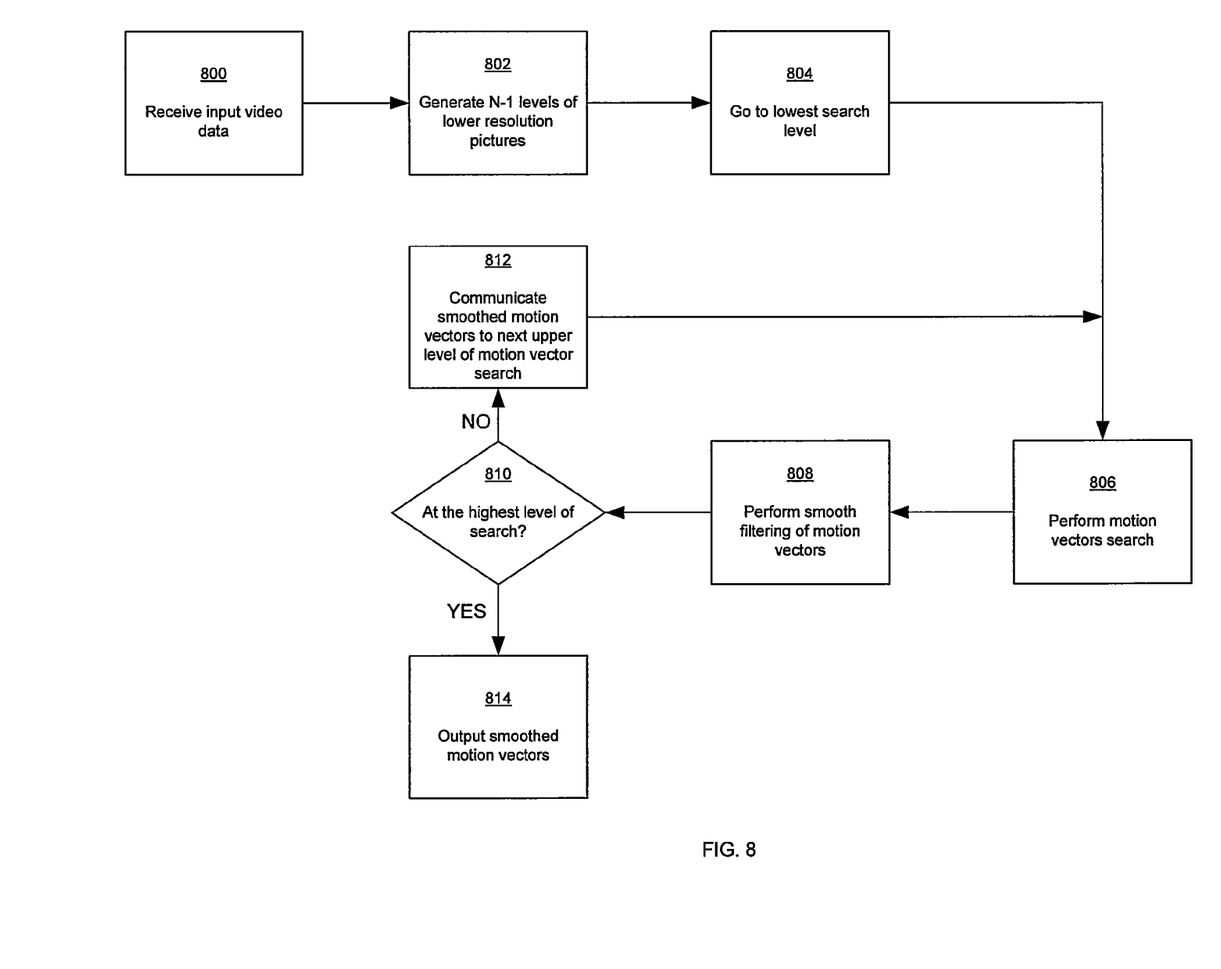
FIG. 8 is a flow diagram illustrating exemplary steps for a hierarchically layered adaptive median motion vector smoothing, in accordance with an embodiment of the invention.

FIG. 8 is a flow diagram illustrating exemplary steps for a hierarchically layered adaptive median motion vector smoothing, in accordance with an embodiment of the invention. Referring to FIG. 8, there are shown steps 800 to 814. In step 800, the search engine 500 may receive full resolution video pictures. In step 802, each full resolution video picture may be sampled to produce lower resolution pictures, and the appropriate lower resolution pictures may be communicated to the appropriate level of motion vector generation. For example, if there are 3 levels of motion vector generation, the top level may perform motion vector generation using the full-resolution pictures, the middle level may perform motion vector generation using half-resolution pictures, and the bottom level may perform motion vector generation using quarter-resolution pictures. Similarly, if there are N levels of motion vector generation, then N−1 lower resolution pictures may be generated for use by the lower N−1 levels, where the specific resolution at each level may be controlled, for example, by the processor 114 and/or the image processor 112.

Accordingly, with 3 levels of search, the search block 532 at the bottom level may receive the quarter-resolution picture from, for example, the sub-sampling block 530. At the middle level, the search block 522 may receive the half-resolution picture from, for example, the sub-sampling block 520. At the top level, the search block 510 may use the full-resolution resolution picture.

In step 804, a motion vector search may be executed at the lowest search level. Accordingly, in instances where there are three levels of motion vector search, the first motion vector search may be performed by, for example, the search block 532 at the bottom level using quarter-resolution pictures. In step 806, a search block, for example, the search block 532 for the bottom level, the search block 522 for the middle level, or the search block 510 for the top level, may generate motion vectors for each of the blocks in a picture. The generated motion vectors may be communicated to a corresponding smoothing filter block, for example, the smoothing filter block 512, 524, or 534. In step 808, the appropriate smoothing filter block may filter the motion vectors to remove spurious motion vectors.

In step 810, a determination may be made as to whether the present search level may be the highest search level. If so, the next step may be step 814. Otherwise, the next step may be step 812. In step 812, the filtered motion vectors may be communicated to the next level up. Prior to communicating the filtered motion vectors to the next level of search, the filtered motion vectors may be scaled appropriately to compensate for the higher resolution at the next level. For example, if the next level has a resolution that is better by a factor of two in the horizontal and vertical directions, the scaling may utilize a factor of two in each direction. The scaling may be performed, for example, by the search block 532 or the smoothing filter block 534. The next step may be step 806.

In step 812, the smoothed motion vectors may be output for further processing by, for example, the image processor 112. The image processor 112 may, for example, use the motion vectors for generating a compressed video file.

In accordance with an embodiment of the invention, aspects of an exemplary system may comprise the search engine 500 generating motion vectors for video pictures at each level of a hierarchical motion estimation process. The motion vectors may be generated, for example, by the search blocks 510, 522, and 532. The search engine at each level of the hierarchical motion estimation process may receive progressively lower resolution video pictures. For example, the full resolution video picture may be sub-sampled by a factor or 2 by the sub-sampling block 520 in both the horizontal and vertical directions to generate half-resolution video pictures. The half-resolution pictures may be further sub-sampled by a factor of 2 by the sub-sampling block 530 to generate quarter-resolution video pictures.

The quarter resolution pictures may be used by the search block 532 to generate motion vectors, which may be filtered by the smoothing filter block 534. The search block 522 may use the half-resolution video pictures and the filtered motion vectors output by the smoothing filter block 534 to generate more refined motion vectors. Since the search block 522 may use half-resolution video pictures, the filtered motion vectors from the smoothing filter block 534 may need to be scaled up to a higher resolution to compensate for the sub-sampling by the sub-sampling block 530. Accordingly, either the search block 532 may scale up motion vectors prior to communicating the motion vectors to the smoothing filter block 534, or the smoothing filter block 534 may need to scale up the motion vectors before communicating the smooth filtered motion vectors to the search block 522.

Similarly, the search block 522 may scale up motion vectors prior to communicating the motion vectors to the smoothing filter block 524, or the smoothing filter block 524 may need to scale up the motion vectors before communicating the smooth filtered motion vectors to the search block 510. The search block 510 may generate further refined motion vectors based on the smoothed motion vectors from the smoothing filter block 524 and the full-resolution video pictures.

The smooth filtering by the smooth filtering blocks 512, 524, and/or 534 may comprise scalar median filtering or vector median filtering. The smooth filtering blocks 512, 524, and/or 534 may have as inputs a plurality of motion vectors. For example, the smooth filtering blocks 512, 524, and/or 534 may have as inputs the motion vector to be filtered, and eight motion vectors from blocks that may be surrounding neighbors of that motion vector. The vector costs of the nine motion vectors may be compared to a threshold vector cost value by the vector cost thresholding block 702 to determine which of those nine motion vector may be used for filtering. For example, a motion vector whose vector cost value may be above the threshold vector cost value may be discarded. The motion vectors that are not discarded may be communicated to the median filter block 704, which may select a motion vector that may be a median of the motion vectors input to the median filter block 704. Accordingly, the threshold vector cost value used for the median filter block 704 may result in using those motion vectors that appear most reliable. This may, for example, effectively adjust the size and/or shape of the median filter. Various embodiments of the invention may also dynamically change the threshold vector cost value of the median filter block 704 based on content of the video pictures.

Another embodiment of the invention may provide a machine-readable storage, having stored thereon, a computer program having at least one code section executable by a machine, thereby causing the machine to perform the steps as described above for hierarchically layered adaptive median motion vector smoothing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A system, comprising:
   a plurality of sub-sampling circuits, a plurality of smoothing filters, and a plurality of search circuits, wherein:
   each of said plurality of sub-sampling circuits is operable to generate based on an input video data, an output video data with lower resolution by applying a particular sub-sampling rate;
   said plurality of sub-sampling circuits are connected in sequence to generate a plurality of sub-sampled copies of an original picture, wherein said input video data corresponds to said original picture at a first one of said sub-sampling circuits and to said output video data of a previous sub-sampling circuit at each subsequent one of said sub-sampling circuits;
   each of said plurality of smoothing filters is operable to remove or reduce spurious motion vectors; and
   each of said plurality of search circuits is operable to determine motion estimation for an input picture, said input picture corresponds to said original picture at a last one of said plurality of search circuits and to one of said plurality of sub-sampled copies at each preceding one of said search circuits, wherein for said determination of said motion estimation, one or more of said plurality of search circuits are operable to:
   determine one or more blocks in a previous picture that match at least one block in said input picture, wherein said previous picture comprises a picture preceding said original picture at said last one of said search circuits, and a sub-sampled copy of said preceding picture matching a sub-sampling rate of said corresponding one of said plurality of sub-sampled copies at each of said preceding one of said search circuits;
   generate motion vectors for said least one block in said input picture;
   smooth filter said generated motion vectors via a corresponding one of said plurality of smoothing filters; and
   for each of said preceding search circuits, scale up said motion vectors, wherein said scaled and smoothed motion vectors are communicated to a subsequent one of said plurality of search circuits for use in refining motion estimation performed by said subsequent one of said plurality of search circuits.

2. The system according to claim 1, wherein said plurality of sub-sampled copies is generated during a hierarchical motion estimation process, and wherein one or more of said plurality of sub-sampling circuits, smoothing filters, or search circuits enable scaling up of one of said generated motion vectors or smooth filtered motion vectors, prior to communication of said smooth filtered motion vectors to a higher level of said hierarchical motion estimation process.

3. The system according to claim 1, wherein said plurality of sub-sampled copies is generated during a hierarchical motion estimation process, and wherein one or more of said plurality of sub-sampling circuits, smoothing filters, or search circuits enable, for each level of said hierarchical motion estimation process, generation of video data that is lower in resolution by a scaling factor in the horizontal direction and a scaling factor in the vertical direction than the resolution of video data at the level immediately above it.

4. The system according to claim 1, wherein said smooth filtering comprises scalar median filtering.

5. The system according to claim 1, wherein said smooth filtering comprises vector median filtering.

6. The system according to claim 1, wherein one or more of said plurality of sub-sampling circuits, smoothing filters, or search circuits enable determination of whether a motion vector is used for said smooth filtering based on a vector cost value of each of said motion vectors compared to a threshold vector cost value.

7. The system according to claim 6, wherein one or more of said plurality of sub-sampling circuits, smoothing filters, or search circuits enable dynamically changing of said threshold vector cost value based on content of said original picture.

8. The system according to claim 6, wherein one or more of said plurality of sub-sampling circuits, smoothing filters, or search circuits enable dynamically changing of said threshold vector cost value to adjust a window size of at least one of said smoothing filters.

9. The system according to claim 1, wherein said plurality of smoothing filters for said smooth filtering of a motion vector, enables processing of said motion vector and a plurality of neighboring motion vectors around said motion vector.

* * * * *